United States Patent
Witczak et al.

(10) Patent No.: US 10,827,238 B2
(45) Date of Patent: Nov. 3, 2020

(54) ELEVATOR DOOR SENSOR INTEGRATED WITH A LONG RANGE COMMUNICATION GATEWAY

(71) Applicant: Otis Elevator Company, Farmington, CT (US)

(72) Inventors: Tadeusz Pawel Witczak, Farmington, CT (US); Craig Drew Bogli, Avon, CT (US); Stella M. Oggianu, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 16/426,176

(22) Filed: May 30, 2019

(65) Prior Publication Data

US 2019/0373341 A1    Dec. 5, 2019

Related U.S. Application Data

(60) Provisional application No. 62/677,897, filed on May 30, 2018.

(51) Int. Cl.
*H04Q 9/00* (2006.01)
*B66B 1/34* (2006.01)
(Continued)

(52) U.S. Cl.
CPC ............. *H04Q 9/00* (2013.01); *B66B 1/3461* (2013.01); *B66B 5/0025* (2013.01); *B66B 13/00* (2013.01);
(Continued)

(58) Field of Classification Search
CPC ................. H04Q 9/00; H04Q 2209/40; H04Q 2209/823; B66B 1/3461; B66B 5/0025; B66B 13/00; B66B 25/006
(Continued)

(56) References Cited

U.S. PATENT DOCUMENTS

2003/0146836 A1* 8/2003 Wood ................. G06K 19/0717
340/540
2004/0233043 A1* 11/2004 Yazawa .............. G06K 19/0717
340/10.3
(Continued)

FOREIGN PATENT DOCUMENTS

CN          204689297 U     10/2015
WO       2009150251 A2     12/2009
(Continued)

OTHER PUBLICATIONS

The Extended Search Report for Application No. 19177509.7-1017; Report date: Oct. 11, 2019; 10 pages.

*Primary Examiner* — Ojiako K Nwugo
(74) *Attorney, Agent, or Firm* — Cantor Colburn LLP (57) ABSTRACT

A sensing apparatus for monitoring a conveyance system is provided. The sensing apparatus includes: a controller; at least one sensor in communication with the controller, the at least one sensors configured to detect sensor data of the conveyance system and communicate the sensor data to the controller; and a long-range communication module in communication with the controller, the long-range communication module being configured to transmit the sensor data to a remote system through a wireless network via long-range wireless communication protocol, wherein the long-range communication module is located within the sensing apparatus.

12 Claims, 5 Drawing Sheets

(51) Int. Cl.
*B66B 5/00* (2006.01)
*B66B 13/00* (2006.01)
*B66B 25/00* (2006.01)

(52) U.S. Cl.
CPC ....... *B66B 25/006* (2013.01); *H04Q 2209/40* (2013.01); *H04Q 2209/823* (2013.01)

(58) Field of Classification Search
USPC .................................................. 340/870.16
See application file for complete search history.

(56) References Cited

U.S. PATENT DOCUMENTS

| | | | | |
|---|---|---|---|---|
| 2005/0057370 | A1* | 3/2005 | Warrior | H04B 7/18506 340/870.01 |
| 2005/0200480 | A1* | 9/2005 | Caras | G08B 25/003 340/539.22 |
| 2006/0220842 | A1* | 10/2006 | Breed | G06Q 10/06 340/539.13 |
| 2008/0077290 | A1* | 3/2008 | Weinmann | G07C 5/008 701/33.4 |
| 2008/0287109 | A1* | 11/2008 | Marett | G06Q 30/0224 455/414.1 |
| 2009/0012667 | A1* | 1/2009 | Matsumoto | G05D 1/0251 701/26 |
| 2011/0315490 | A1 | 12/2011 | Shi et al. | |
| 2012/0252488 | A1* | 10/2012 | Hartmann | G06Q 10/08 455/456.1 |
| 2012/0319866 | A1* | 12/2012 | Svoen | H04Q 9/00 340/870.39 |
| 2013/0012123 | A1* | 1/2013 | DeLuca | A45C 13/18 455/39 |
| 2014/0139353 | A1* | 5/2014 | Wojcieszak | A43B 3/0078 340/870.16 |
| 2015/0284214 | A1 | 10/2015 | Park et al. | |
| 2015/0312653 | A1* | 10/2015 | Avrahami | H04Q 9/00 340/870.07 |
| 2016/0048712 | A1* | 2/2016 | Butler | H04L 67/1097 340/10.51 |
| 2016/0371957 | A1* | 12/2016 | Ghaffari | G01M 5/00 |
| 2018/0111788 | A1* | 4/2018 | Kim | B66B 1/2408 |
| 2019/0375610 | A1* | 12/2019 | Svensson-Hilford | B66B 5/0018 |
| 2020/0130990 | A1* | 4/2020 | Mustonen | B66B 1/28 |

FOREIGN PATENT DOCUMENTS

| | | |
|---|---|---|
| WO | 2014200457 A1 | 12/2014 |
| WO | 2015018741 A1 | 2/2015 |

* cited by examiner

ELEVATOR DOOR SENSOR INTEGRATED WITH A LONG RANGE COMMUNICATION GATEWAY

CROSS-REFERENCE TO RELATED APPLICATIONS

This application claims the benefit of U.S. Provisional Application No. 62/677,897 filed May 30, 2018, which is incorporated herein by reference in its entirety.

BACKGROUND

The embodiments herein relate to the field of conveyance systems, and specifically to a method and apparatus method and apparatus for monitoring conveyance systems.

Conveyance systems, such as, for example, elevator systems, escalator systems, and moving walkways, may need to communicate with other devices or systems in a wireless manner. Often long-range communication signal propagation into buildings and more specifically into hoistway is low, which forces elevator systems to use short-range communication to a gateway device or signal repeater to reach a network outside of the building.

BRIEF SUMMARY

According to an embodiment, a sensing apparatus for monitoring a conveyance system is provided. The sensing apparatus includes: a controller; at least one sensor in communication with the controller, the at least one sensors configured to detect sensor data of the conveyance system and communicate the sensor data to the controller; and a long-range communication module in communication with the controller, the long-range communication module being configured to transmit the sensor data to a remote system through a wireless network via long-range wireless communication protocol, wherein the long-range communication module is located within the sensing apparatus.

In addition to one or more of the features described herein, or as an alternative, further embodiments may include that the long-range communication module is configured to detect a network signal strength of the wireless network.

In addition to one or more of the features described herein, or as an alternative, further embodiments may include that the long-range communication module is configured to transmit the sensor data to a remote system through a wireless network when the network signal strength of the wireless network is greater than a threshold.

In addition to one or more of the features described herein, or as an alternative, further embodiments may include that the conveyance system is an elevator system including an elevator car.

In addition to one or more of the features described herein, or as an alternative, further embodiments may include that the sensing apparatus is configured to be attached to a door of the elevator car of the elevator system.

In addition to one or more of the features described herein, or as an alternative, further embodiments may include that the sensing apparatus is configured to be attached to a door hanger of a door of the elevator car of the elevator system.

In addition to one or more of the features described herein, or as an alternative, further embodiments may include that the controller is configured to process the sensor data prior to the long-range communication module transmitting the sensor data to the remote system through a wireless network via long-range wireless communication protocol.

In addition to one or more of the features described herein, or as an alternative, further embodiments may include that the long-range communication module is configured to transmit sensor data that is unprocessed to the remote system through a wireless network via long-range wireless communication protocol.

According to another embodiment, a sensing system is provided for monitoring a conveyance system. The sensing system including: a conveyance apparatus of the conveyance system; and a sensing apparatus attached to the conveyance apparatus, the sensing apparatus including: a controller; at least one sensor in communication with the controller, the at least one sensor configured to detect sensor data of the conveyance system and communicate the sensor data to the controller; and a long-range communication module in communication with the controller, the long-range communication module being configured to transmit the sensor data to a remote system through a wireless network via long-range wireless communication protocol, the long-range communication module is located within the sensing apparatus.

In addition to one or more of the features described herein, or as an alternative, further embodiments may include that the conveyance system is an elevator system and the conveyance apparatus is an elevator car.

In addition to one or more of the features described herein, or as an alternative, further embodiments may include that the sensing apparatus is attached to a door of the elevator car of the elevator system.

In addition to one or more of the features described herein, or as an alternative, further embodiments may include that the sensing apparatus is attached to a door hanger of a door of the elevator car of the elevator system.

In addition to one or more of the features described herein, or as an alternative, further embodiments may include that the conveyance system is an escalator system and the conveyance apparatus is a moving stair of the escalator system.

In addition to one or more of the features described herein, or as an alternative, further embodiments may include that the long-range communication module is configured to detect a network signal strength of the wireless network.

In addition to one or more of the features described herein, or as an alternative, further embodiments may include that the long-range communication module is configured to transmit the sensor data to a remote system through the wireless network when the network signal strength of the wireless network is greater than a threshold.

In addition to one or more of the features described herein, or as an alternative, further embodiments may include: a power source configured to provide electrical power to the sensing apparatus, wherein the power source is configured to generate power for the sensing apparatus.

In addition to one or more of the features described herein, or as an alternative, further embodiments may include that the controller is configured to process the sensor data prior to the long-range communication module transmitting the sensor data to the remote system through a wireless network via long-range wireless communication protocol.

In addition to one or more of the features described herein, or as an alternative, further embodiments may include that the long-range communication module is configured to transmit sensor data that is unprocessed to the remote system through a wireless network via long-range wireless communication protocol.

According to another embodiment, a method for data transfer in a conveyance system is provided. The method including: collecting sensor data of the conveyance system using at least one sensor of a sensing apparatus attached to a conveyance apparatus of the conveyance system; storing the sensor data in a memory of the sensing apparatus; transmitting the sensor data to a remote system through a network via a long-range wireless protocol using a long-range communication module located internal to the sensing apparatus.

In addition to one or more of the features described herein, or as an alternative, further embodiments may include: detecting a network signal strength of the wireless network via long-range wireless protocol using the long-range communication module, wherein the long-range communication module is configured to transmit the sensor data to a remote system through the wireless network when the network signal strength of the wireless network is greater than a threshold.

Technical effects of embodiments of the present disclosure include utilizing a long-range communication module internal to a sensing apparatus to transmit sensor data to a network outside of a building when a network wireless signal strength is above a selected strength.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
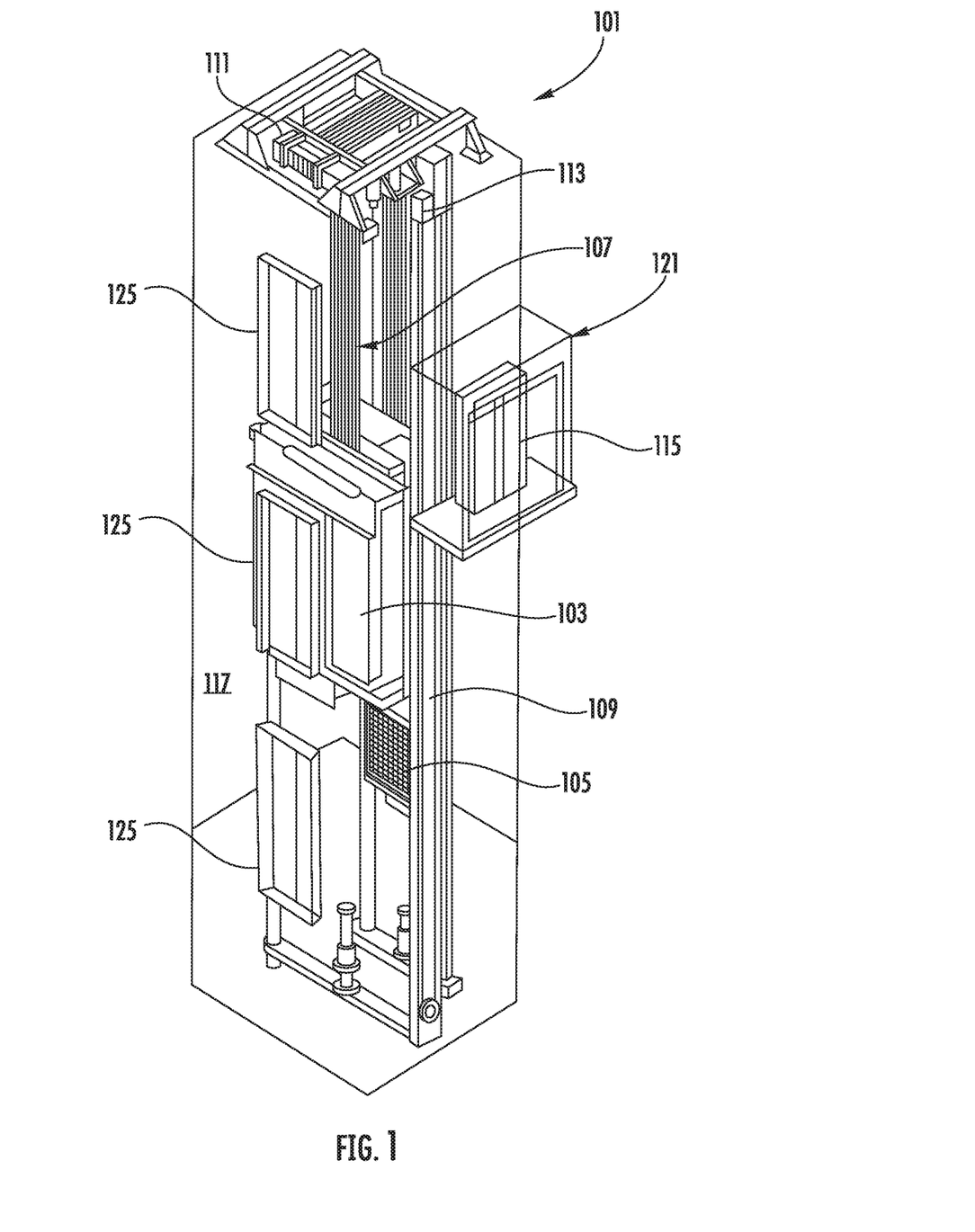
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a system controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The system controller 115 is located, as shown, in a controller room 121 of the elevator shaft 117 and is configured to control the operation of the elevator system 101, and particularly the elevator car 103. For example, the system controller 115 may provide drive signals to the machine 111 to control the acceleration, deceleration, leveling, stopping, etc. of the elevator car 103. The system controller 115 may also be configured to receive position signals from the position reference system 113 or any other desired position reference device. When moving up or down within the elevator shaft 117 along guide rail 109, the elevator car 103 may stop at one or more landings 125 as controlled by the system controller 115. Although shown in a controller room 121, those of skill in the art will appreciate that the controller 115 can be located and/or configured in other locations or positions within the elevator system 101. In one embodiment, the system controller 115 may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance system component such as an elevator car 103 of the elevator system 101. In another example, embodiments disclosed herein may be applicable conveyance systems such as an escalator system and a conveyance system component such as a moving stair of the escalator system.

Figures 2, 3:
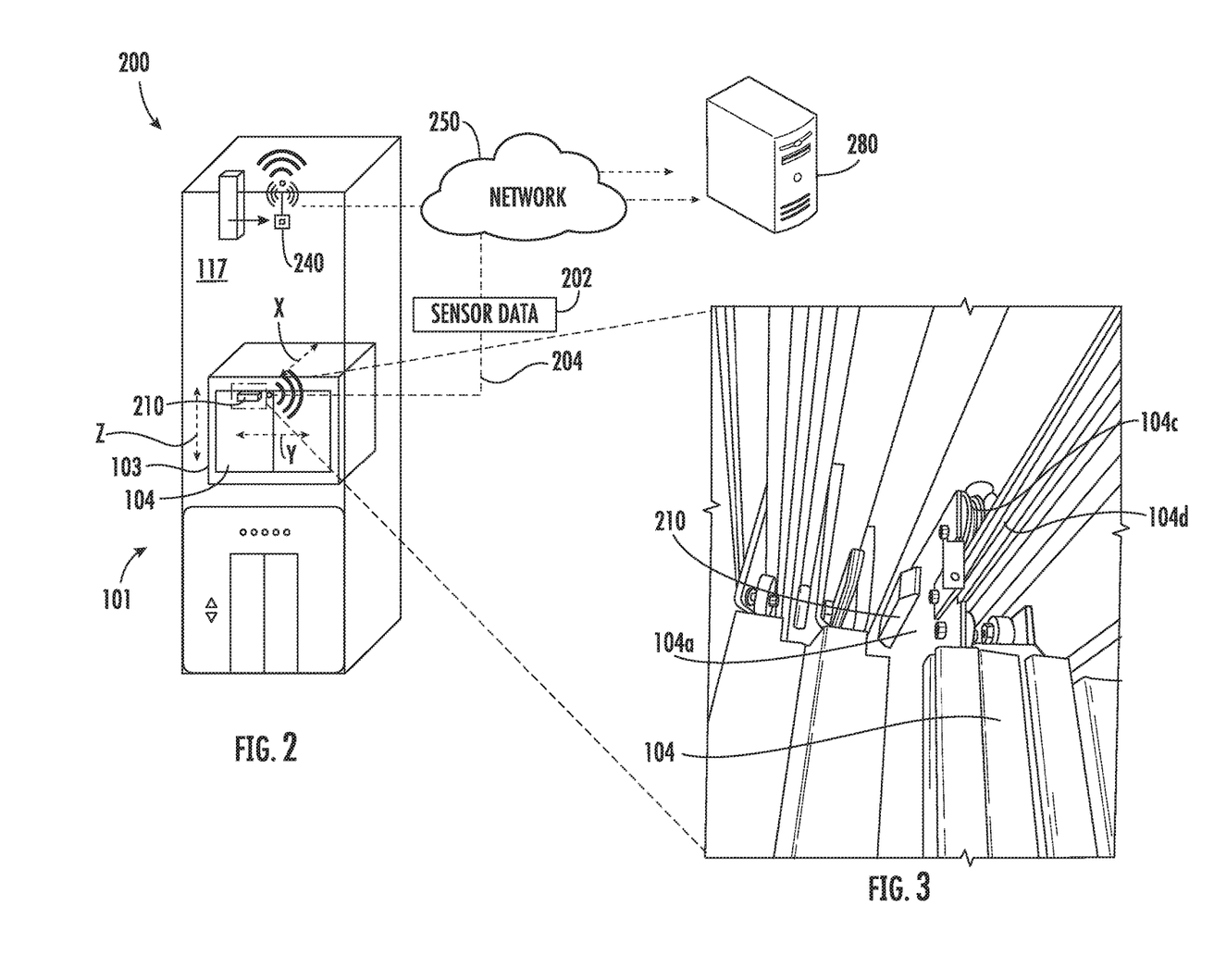
FIG. 2 is a schematic illustration of a sensor system for the elevator system of FIG. 1, in accordance with an embodiment of the disclosure.
FIG. 3 is a schematic illustration of the location of sensing apparatus of the sensor system of FIG. 2, in accordance with an embodiment of the disclosure.

FIG. 2 is a view of a sensor system 200 including a sensing apparatus 210, according to an embodiment of the present disclosure. The sensing apparatus 210 is configured to detect sensor data 202 of the elevator car 103 and transmit the sensor data 202 to a remote system 280. Sensing data 202 may include but is not limited to accelerations and derivatives or integrals of accelerations, such as, for example, velocity, jerk, jounce, snap . . . etc. Sensing data 202 may also include light, pressure, sound, humidity, and temperature. In an embodiment, the sensing apparatus 210 is configured to process the sensor data 202 prior to transmitting the sensor data 202 to the remote system 280. The processing of the sensor data 202 may reveal data, such as, for example, a number of elevator door openings/closings, elevator door time, vibrations, a number of elevator rides, elevator ride performance, and elevator flight time. In an embodiment, the sensing apparatus 210 is configured to transmit sensor data 202 that is raw and unprocessed to the remote system 280 for processing. The remote system 280 may be a computing device, such as, for example, a desktop computer, server, cloud computer, etc. The remote system 280 may also be a mobile computing device that is typically carried by a person, such as, for example a smartphone, PDA, smartwatch, tablet, laptop, etc. The remote system 280 may also be two separate devices that are synced together, such as, for example, a cellular phone and a desktop computer synced over an internet connection. The remote system 280 may use data from the sensing apparatus 210 for predictive maintenance analysis.

Conventional sensing apparatus transmit the sensor data 202 to the remote system 280 via short-range wireless protocols. Short-range wireless protocols may include but are not limited to Bluetooth, Wi-Fi, HaLow (801.11ah), or Wireless M-Bus. Conventional sensing apparatus would transmit the sensor data 202, using short-range wireless protocols, to a local gateway device 240 and the local gateway device 240 would then be configured to transmit the sensor data 202 to the remote system 280 through a network 250. The sensing apparatus 210 of the present disclosure is configured to transmit the sensor data 202 to the remote system 280 via long-range wireless protocols 204. Long-range wireless protocols 204 may include but are not limited to cellular, satellite, GSM, CDMA, LTE (NB-IoT, CAT M1), LoRa, Ingenu or SigFox. Using long-range wireless protocols 204, the sensing apparatus 210 is configured to transmit the sensor data 202 to a remote system 280 through a network 250. The network 250 may be a computing network, such as, for example, a cloud computing network, cellular network, or any other computing network known to one of skill in the art. Advantageously, by transmitting directly to the network 250 using long-range communication protocols, the installation of the sensing device is simplified because only one device needs to be installed rather than two devices, such as a sensing apparatus 210 and a gateway device 240.

FIG. 2 shows a possible installation location of the sensing apparatus 210 within the elevator system 101. In an embodiment, the sensing apparatus 210 may be attached to a door 104 of the elevator car 103. Advantageously, by attaching the sensing apparatus 210 to the door 104 of the elevator car 103 the sensing apparatus 210 may detect accelerations of the elevator car 103 and the doors 104 of the elevator car 103. For example, when located on the door 104, the sensing apparatus 210 may detect when the elevator car 103 is in motion, when the elevator car 103 is slowing, when the elevator car 103 is stopping, and when the doors 104 open to allow passengers to exit and enter the elevator car 103. It is understood that the sensing apparatus 210 may also be installed in other locations other than a door 104 of the elevator system 101. The sensing apparatus 210 may be configured to detect acceleration in any number of directions. In an embodiment, the sensing apparatus may detect accelerations in three directions, a first direction X, a second direction Y, and a third direction Z, as show in in FIG. 2. The first direction X may be perpendicular to the doors 104 of the elevator car 103, as shown in FIG. 2. The second direction Y may be parallel to the doors 104 of the elevator car 103, as shown in FIG. 2. The third direction Z may be aligned vertically parallel with the elevator shaft 117 and pull of gravity, as shown in FIG. 2.

FIG. 3 is an enlarged view of a possible installation location of the sensing apparatus 210 within the elevator system 101. As shown in FIG. 3, the sensing apparatus may be located on a door hanger 104a of the door 104 of the elevator car 103. The door hanger 104a is located proximate a top portion 104b of the door 104 proximate the guide wheels 104c that allow the door 104 to slide open and close along a guide rail 104d. Advantageously, the door hanger 104a is an easy to access area to attach the sensing apparatus 210 because the door hanger 104a is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door hanger 104a also provides ample clearance for the sensing apparatus 210 during operation of the elevator car 103, such as, for example, door 104 opening and closing. Also, advantageously, by placing the sensing apparatus 210 on the elevator door 104 sensor data 202 including acceleration data of the door 104 may be collected.

Figure 4:
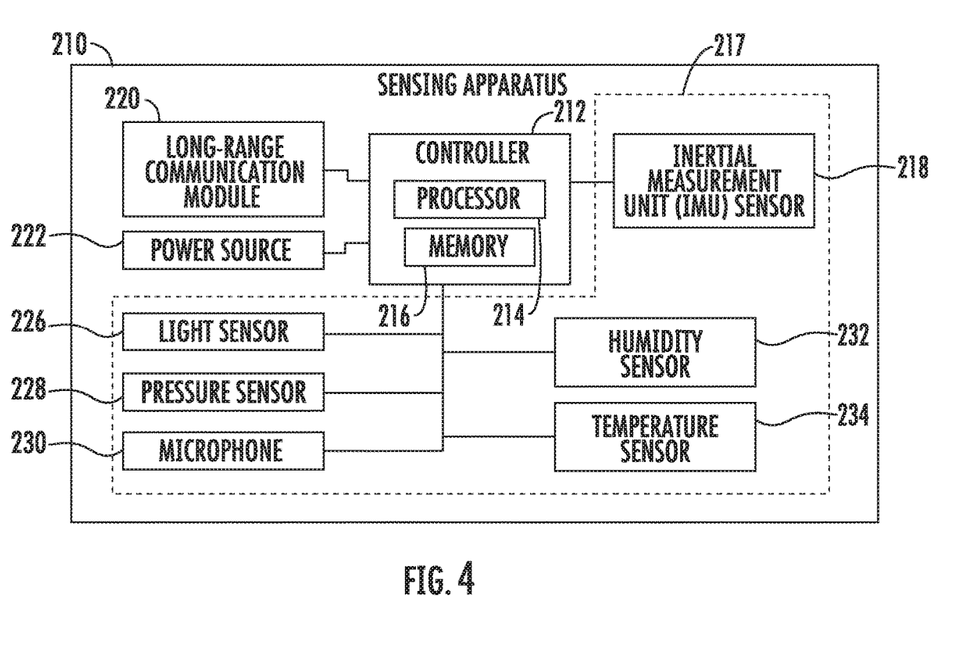
FIG. 4 is a schematic illustration of a sensing apparatus of the sensor system of FIG. 2, in accordance with an embodiment of the disclosure.

FIG. 4 illustrates a block diagram of the sensing apparatus 210 of the sensing system 200 of FIG. 2. It should be appreciated that, although particular systems are separately defined in the schematic block diagram of FIG. 4, each or any of the systems may be otherwise combined or separated via hardware and/or software. As shown in FIG. 4, the sensing apparatus 210 may include a controller 212, at least one sensor 217 in communication with the controller 212, a long-range communication module 220 in communication with the controller 212, and a power source 222 electrically connected to the controller 212.

The at least one sensor 217 includes an inertial measurement unit (IMU) sensor 218 is configured to detect sensor data 202 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The sensor data 202 detected by the IMU sensor 218 may include accelerations as well as derivatives or integrals of accelerations, such as, for example, velocity, jerk, jounce, snap . . . etc. The IMU sensor 218 is in communication with the controller 212 of the sensing apparatus 210.

The at least one sensor 217 may also include additional sensors including but not limited to a light sensor 226, a pressure sensor 228, a microphone 230, a humidity sensor 232, and a temperature sensor 234. The light sensor 226 is configured to detect sensor data 202 including light exposure. The light sensor 226 is in communication with the controller 212. The pressure sensor 228 is configured to detect sensor data 202 including pressure levels. The pressure sensor 228 is in communication with the controller 212. The microphone 230 is configured to detect sensor data 202 including audible sound and sound levels. The microphone 230 is in communication with the controller 212. The humidity sensor 232 is configured to detect sensor data 202 including humidity levels. The humidity sensor 232 is in communication with the controller 212. The temperature sensor 234 is configured to detect sensor data 202 including temperature levels. The temperature sensor 234 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, processing the sensor data 202 collected by the IMU sensor 218, the light sensor 226, the pressure sensor 228, the microphone 230, the humidity sensor 232, and the temperature sensor 234. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art. The power source 222 may also be rechargeable via an air transformer configured to transfer electric charge to the power source 222 as the elevator car 103 moves past the air transformer in the hoistway 117.

The sensing apparatus 210 includes a long-range communication module 220 located within the sensing apparatus 210. The long-range communication module 220 is configured to allow the controller 212 of the sensing apparatus 210 to communicate with the remote system 280 through long-range wireless protocols 204. The long-range communication module 220 may be configured to communicate with the remote system 280 using long-range wireless protocols 204, such as for example, cellular, satellite, GSM, CDMA, LTE (NB-IoT, CAT M1), LoRa, Ingenu, SigFox, or other long-range wireless protocol known to one of skill in the art. Using long-range wireless protocols 204, the long-range communication module 220 is configured to transmit the sensor data 202 to a remote system 280 through a network 250. The long-range communication module 220 is configured to transmit sensor data 202 outside of the hoistway 117 and outside of a building where the hoistway 117 is located.

Figure 5:
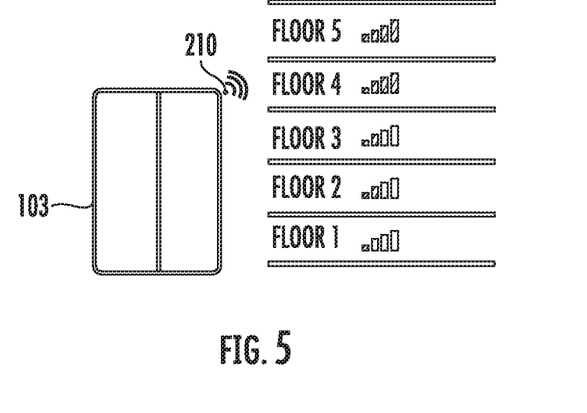
FIG. 5 illustrates detecting network signal strength, in accordance with an embodiment of the disclosure.

As the conveyance system component travels, the sensing apparatus 210 collects sensor data 202 and stores the sensor data 202 in memory 216. For example, in an elevator system 101, the conveyance system apparatus (e.g., the elevator car 103) travels along a hoistway 117 and will experience different signal strengths for the network 250 along the hoistway 117. FIG. 5 depicts a representation of an exemplary network signal strength of the network 250 as elevator car 103 travels along floors 1-5. As shown, the network signal strength of the network 250 is greatest on floors 4 and 5. As described further herein, the sensing apparatus 210 may defer sending sensor data 202 to the remote system 280 until the network signal strength of the network 250 is best or above a threshold, which may be a numerical value of signal strength manually set by an individual as a chosen threshold or automatically set based on the limitations of hardware associated with the sensing apparatus 210, network 250, and or remote system. As mentioned above, the long-range communication module 220 is configured to communicate with the network 250 using long-range wireless protocols 204, thus the network signal strength of the network 250 is long-range wireless signal strength, which may be affected by multiple impedances within a building such as, for example, building walls and hoistway walls and may differ from building to building.

Figure 6:
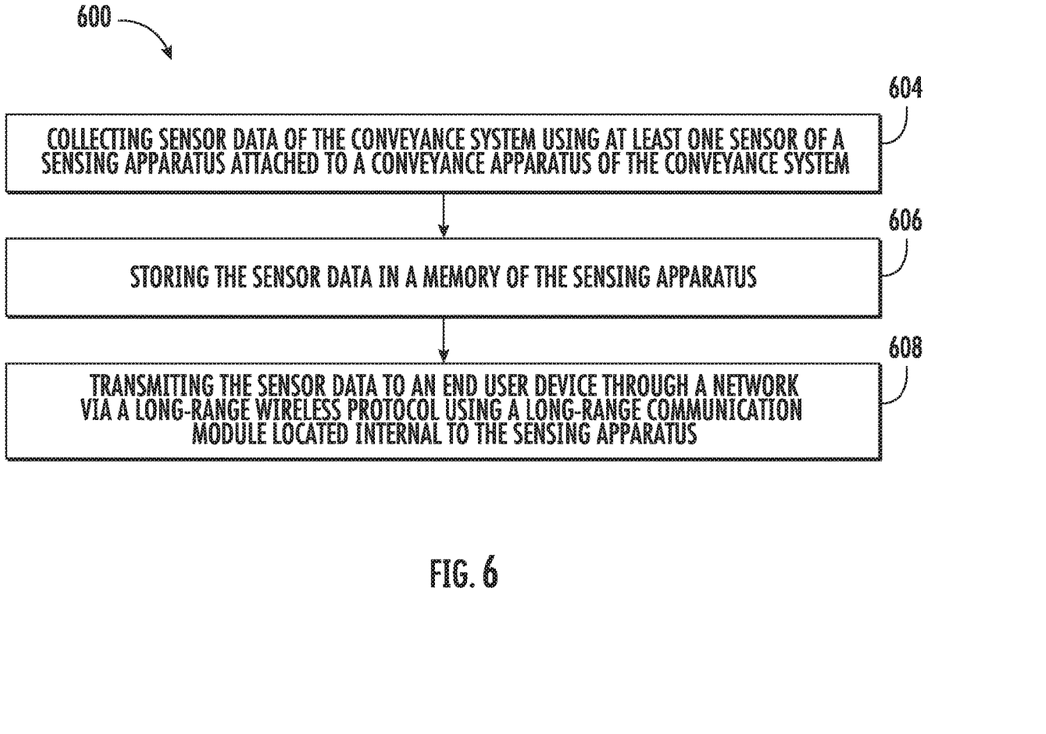
FIG. 6 is a flow chart of a method of data transfer in a conveyance system, in accordance with an embodiment of the disclosure.

Referring now to FIG. 6, while referencing components of FIGS. 1-5. FIG. 6 shows a flow chart of a method 600 for data transfer in a conveyance system, in accordance with an embodiment of the disclosure. At block 604, sensor data 202 of the conveyance system is collected using at least one sensor 217 of a sensing apparatus 210 attached to the conveyance apparatus. At block 606, the sensor data 202 is stored in a memory 216 of the sensing apparatus 210. At block 608, the sensor data 202 is transmitted to a remote system 280 through a network 250 via a long-range wireless protocol 204 using a long-range communication module 220 located internal to the sensing apparatus 210.

The method 600 may further include that a network signal strength of the wireless network 250 is detected using long-range wireless protocol 204 using the long-range communication module 220 located internal to the sensing apparatus 210. The long-range communication module 220 is configured to transmit the sensor data 202 to a remote system 280 through the wireless network 250 when the network signal strength of the wireless network 250 is greater than a threshold.

While the above description has described the flow process of FIG. 6 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

As described above, embodiments can be in the form of processor-implemented processes and devices for practicing those processes, such as a processor 214 in sensing apparatus 210. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A sensing apparatus for monitoring an elevator system comprising an elevator car, the sensing apparatus comprising:
   a controller, the controller comprising: a processor and a memory;
   at least one sensor in communication with the controller, the at least one sensors configured to detect sensor data of the elevator system and communicate the sensor data to the controller; and
   a long-range communication module in communication with the controller, the long-range communication module being configured to transmit the sensor data to a remote system through a wireless network via long-range wireless communication protocol,
   wherein the long-range communication module is located within the sensing apparatus,
   wherein the long-range communication module is configured to detect a network signal strength of the wireless network, the network signal strength varying along a hoistway of the elevator system, and
   wherein the long-range communication module is configured to store the sensor data within the memory of the control until the network signal strength of the wireless network is greater than a threshold and then transmit the sensor data to a remote system through the wireless network when the network signal strength of the wireless network is greater than a threshold.

2. The sensing apparatus of claim 1, wherein the sensing apparatus is configured to be attached to a door of the elevator car of the elevator system.

3. The sensing apparatus of claim 1, wherein the sensing apparatus is configured to be attached to a door hanger of a door of the elevator car of the elevator system.

4. The sensing apparatus of claim 1, wherein the controller is configured to process the sensor data prior to the long-range communication module transmitting the sensor data to the remote system through a wireless network via long-range wireless communication protocol.

5. The sensing apparatus of claim 1, wherein the long-range communication module is configured to transmit sensor data that is unprocessed to the remote system through a wireless network via long-range wireless communication protocol.

6. A sensing system for monitoring an elevator system, the sensing system comprising:
   an elevator car of the elevator system; and
   a sensing apparatus attached to the elevator car, the sensing apparatus comprising:
      a controller, the controller comprising: a processor and a memory;
   at least one sensor in communication with the controller, the at least one sensor configured to detect sensor data of the elevator system and communicate the sensor data to the controller; and
   a long-range communication module in communication with the controller, the long-range communication module being configured to transmit the sensor data to a remote system through a wireless network via long-range wireless communication protocol,
   wherein the long-range communication module is located within the sensing apparatus,
   wherein the long-range communication module is configured to detect a network signal strength of the wireless network, the network signal strength varying along a hoistway of the elevator system, and
   wherein the long-range communication module is configured to store the sensor data within the memory of the control until the network signal strength of the wireless network is greater than a threshold and then transmit the sensor data to a remote system through the wireless network when the network signal strength of the wireless network is greater than a threshold.

7. The sensing system of claim 6, wherein the sensing apparatus is attached to a door of the elevator car of the elevator system.

8. The sensing system of claim 6, wherein the sensing apparatus is attached to a door hanger of a door of the elevator car of the elevator system.

9. The sensing system of claim 6, further comprising:
   a power source configured to provide electrical power to the sensing apparatus, wherein the power source is configured to generate power for the sensing apparatus.

10. The sensing system of claim 6, wherein the controller is configured to process the sensor data prior to the long-range communication module transmitting the sensor data to the remote system through a wireless network via long-range wireless communication protocol.

11. The sensing system of claim 6, wherein the long-range communication module is configured to transmit sensor data that is unprocessed to the remote system through a wireless network via long-range wireless communication protocol.

12. A method for data transfer in an elevator system comprising an elevator car, the method comprising:
- collecting sensor data of the elevator system using at least one sensor of a sensing apparatus attached to the elevator car of the elevator system;
- detecting a network signal strength of the wireless network via long-range wireless protocol using the long-range communication module, the network signal strength varying along a hoistway of the elevator system;
- storing the sensor data in a memory of the sensing apparatus until the network signal strength of the wireless network is greater than a threshold;
- transmitting the sensor data to a remote system through a network via a long-range wireless protocol when the network signal strength of the wireless network is greater than a threshold using a long-range communication module located internal to the sensing apparatus.

\* \* \* \* \*